United States Patent [19]

Manning et al.

[11] Patent Number: 5,605,590

[45] Date of Patent: Feb. 25, 1997

[54] METHODS FOR SEALING LIQUID-COOLED STATOR BAR END CONNECTIONS FOR A GENERATOR

[75] Inventors: Michael P. Manning, Watervliet; Robert T. Lembke, Amsterdam; Larry S. Rosenzweig, Clifton Park; Mark Markovitz, Schenectady, all of N.Y.

[73] Assignee: General Electric Co., Schenectady, N.Y.

[21] Appl. No.: 446,158

[22] Filed: May 22, 1995

[51] Int. Cl.⁶ ........................................... B32B 35/00
[52] U.S. Cl. .................. 156/94; 29/402.02; 29/402.18; 156/305; 264/36; 427/140; 427/142
[58] Field of Search .................................. 156/94; 264/36; 427/140, 142; 29/402.02, 402.18

[56] References Cited

U.S. PATENT DOCUMENTS

| | | | |
|---|---|---|---|
| 4,226,921 | 10/1980 | Tsang | 264/36 |
| 4,406,580 | 9/1983 | Baran | 415/118 |
| 4,713,120 | 12/1987 | Hodgens | 134/3 |
| 4,780,162 | 10/1988 | Forler | 156/94 |
| 5,049,217 | 9/1991 | Forler | 156/94 |
| 5,350,815 | 9/1994 | Markovitz et al. | |
| 5,492,004 | 2/1996 | Berg | 73/40.7 |

*Primary Examiner*—Daniel Stemmer
*Attorney, Agent, or Firm*—Nixon & Vanderhye

[57] ABSTRACT

The method includes sealing the stator bar end connections from within the stator bar end fitting. Particularly, a low viscosity epoxy is initially applied from within the chamber of the end fitting by use of a boroscope and a syringe-type applicator, the low viscosity epoxy being applied to all joints between the adjacent strands of the stator bar and between the fitting and the outermost strands of the stator bar. A high viscosity epoxy is then applied over the low viscosity epoxy using the boroscope and applicator to provide a thick barrier seal between the liquid coolant in the chamber and the brazing material. The epoxy is then cured. The process ensures that the brazing material is isolated from the liquid coolant by the barrier seal whereby potential leaks are prevented and partially developed leaks or leaks extant are arrested because sealant material is disposed at the liquid coolant/braze interface.

19 Claims, 4 Drawing Sheets

1

METHODS FOR SEALING LIQUID-COOLED STATOR BAR END CONNECTIONS FOR A GENERATOR

TECHNICAL FIELD

The present invention relates to methods for effecting seals at the stator bar end connections of a generator and particularly to a method for sealing between the stator bar end fitting opening and outermost strands of the end stator bar, as well as between the strands forming the ends of the stator bar.

BACKGROUND

Water-cooled stator bars for electrical generators are comprised of a plurality of small rectangular solid and hollow copper strands which are brazed to one another and brazed to an end fitting. The end fitting serves as both an electrical and a hydraulic connection for the stator bar. The end fitting typically includes an enclosed chamber for ingress or egress of stator bar cooling liquid, typically deionized water. Another opening of the end fitting receives the ends of the strands of the stator bar, the fitting and peripherally outermost copper strands of the stator bar being brazed to one another. Over time, leaks have variously developed about the connection between the stator bar ends and the stator bar fitting as well as between adjacent strands. It is believed, based on leak analysis results, that the leak mechanism is due to a two-part corrosion process which initiates in the braze alloy at the interior surface of the braze joint. Stagnant water in contact with the braze alloy and the copper strands, is believed to cause corrosion and consequent leakage.

Field repair of leaks through the stator bar end connections has only been moderately successful. Typically, a leak site is identified by external visual examination methods where the strands enter the end fitting. External visual leak detection, however, can only indirectly identify the leak site because the external evidence of the leak may be located a considerable distance from the actual leak path. This is particularly true if the leak is occurring between the strands of the stator bar. Once a leak is identified in this manner, a vacuum is drawn inside the fitting and stator bar. An anaerobic cement is then applied externally around the suspected leak sites, the vacuum suction drawing the cement inwardly into the leak path. However, it has been found that this repair method is not 100% effective in repairing the leak and is therefore considered only a temporary repair. Frequently, the inability to repair leakage through the stator bar end connections forces generator owners to replace the leaking bars or the entire stator winding to eliminate the leaks. This replacement, of course, is expensive and requires significant generator downtime.

DISCLOSURE OF THE INVENTION

According to the present invention, the stator bar leak repair is accomplished from the inside of the end fitting. Because the leaks are believed to be caused by a corrosion process initiated at brazing material exposed internally to the cooling liquid, it has been found to be more effective to repair the leakage site from the inside of the fitting rather than externally of the fitting. Moreover, in a preferred embodiment of the present invention, not only is the actual leakage path sealed, but also all other potential leakage paths are likewise sealed in employing the present method. Consequently, in the preferred embodiment, the prior essential step of locating the leak is entirely eliminated. Recognizing that the only leakage paths are between the strands of the stator bar and between the fitting and the outermost strands of the stator bar at the brazing material, an epoxy material is provided in accordance with this invention internally of the fitting to overlay the brazing material and all of the potential leak paths whereby the perceived cause of the initiation of the leaks, i.e., stagnant water in contact with the brazing material, is eliminated.

More particularly, the present invention provides a viewer, e.g., a flexible boroscope, for insertion through the opening in the end fitting through which cooling liquid, e.g., deionized water, normally flows. Consequently, by use of the viewer, the potential leakage sites, e.g., at the joint between the fitting and the outermost strands of the stator bar, as well as between adjacent hollow and solid strands of the stator bar can be viewed. Additionally, an applicator, for example, a syringe containing an epoxy can likewise be inserted through the opening in the fitting to apply the epoxy to the potential leakage sites. In the preferred embodiment, all of the potential leakage paths are sealed by the epoxy. Preferably, the epoxy may be applied internally to the joint between the outermost strands and the internal wall defining the opening through the fitting, as well as between the ends of the strands themselves overlying the brazing material. Consequently, the entirety of the joint surface overlying the brazing material is filled with epoxy material sealing the potential leakage paths and preventing any stagnant cooling liquid in the cooling system from contact with the braze alloy.

Further, and in accordance with the present invention, the epoxy may be applied in two parts. A first epoxy part having a low viscosity can be applied by using the viewer and syringe combination whereby the applied epoxy may run into adjacent areas of the joints. The second part of the epoxy formed of higher viscosity may subsequently be applied to complete a barrier seal between the cooling liquid and the braze alloy at all exposed surfaces of said alloy. The epoxy is then cured by heating and, when cured, the entirety of the leakage paths are sealed. Consequently, not only are the one or more leakage paths which cause the initial observable leak sealed but also any new leaks are prevented. Partially developed leaks are also arrested because of the epoxy covering at the cooling liquid/braze alloy interface. As a consequence, a more reliable leak repair can be effected, as well as prevention of future leaks. Further, the method of application is applicable to generators in the field and does not necessitate the removal of the stator bars or any extended generator outage periods.

In a preferred embodiment according to the present invention, there is provided a method of sealing a stator bar end and a fitting receiving the end to effect a liquid seal, the fitting having a chamber for receiving a liquid through an opening in the fitting and in communication with hollow strands forming at least a portion of the stator bar end for flow of the liquid through the hollow strands, comprising the steps of inserting a viewer and epoxy applicator through the opening in the fitting for viewing a joint portion between the fitting and the stator bar end and applying epoxy thereto, respectively, viewing the joint portion, applying the epoxy to the joint portion using the applicator while maintaining the joint portion in view through the viewer and curing the epoxy to form a liquid seal at the portion of the joint to which the epoxy is applied.

In a further preferred embodiment according to the present invention, there is provided a method of sealing a stator bar end and a fitting receiving the end to effect a liquid seal, the fitting having a chamber for receiving a liquid through an opening and in communication with hollow strands forming at least part of the stator bar ends for flow of the liquid through the hollow strands, comprising the steps of inserting a viewer through the opening in the fitting for viewing joint portions between adjacent strands, inserting an epoxy applicator through the fitting opening, viewing the joint portions between the strands, applying the epoxy to the joint portions between the strands while maintaining the joint portions between the strands in view through the viewer and curing the epoxy to form a liquid seal at the portion of the joints to which the epoxy is applied.

Accordingly, it is a primary object of the present invention to provide a novel and improved method for sealing generator stator bar end connections to prevent leakage of cooling liquid and particularly, in a preferred embodiment, to seal all potential leakage paths between the hydraulic end fitting and the strands of the stator bar, as well as between the strands themselves.

BEST MODE FOR CARRYING OUT THE INVENTION

Figure 1:
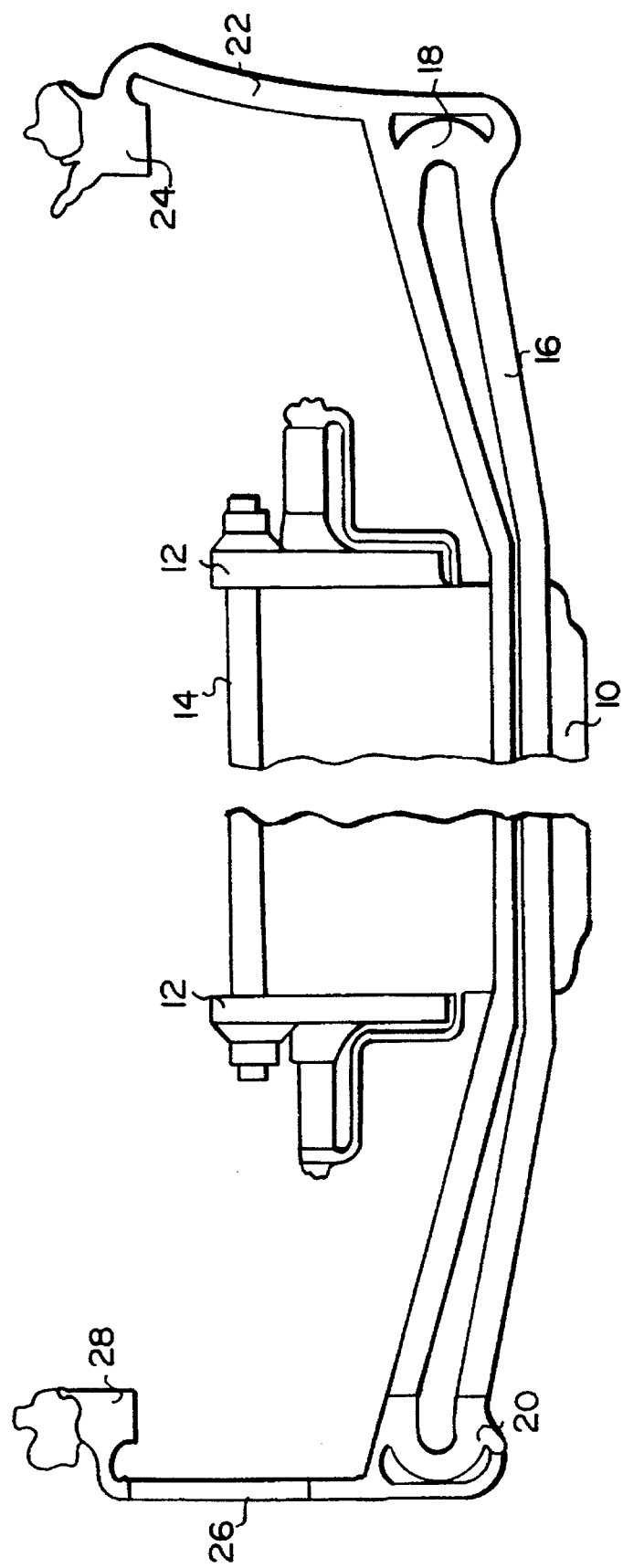
FIG. 1 is a schematic illustration of a liquid-cooled stator winding arrangement illustrating the stator bars and end fittings coupled to inlet and outlet coolant headers.
Figure 2:
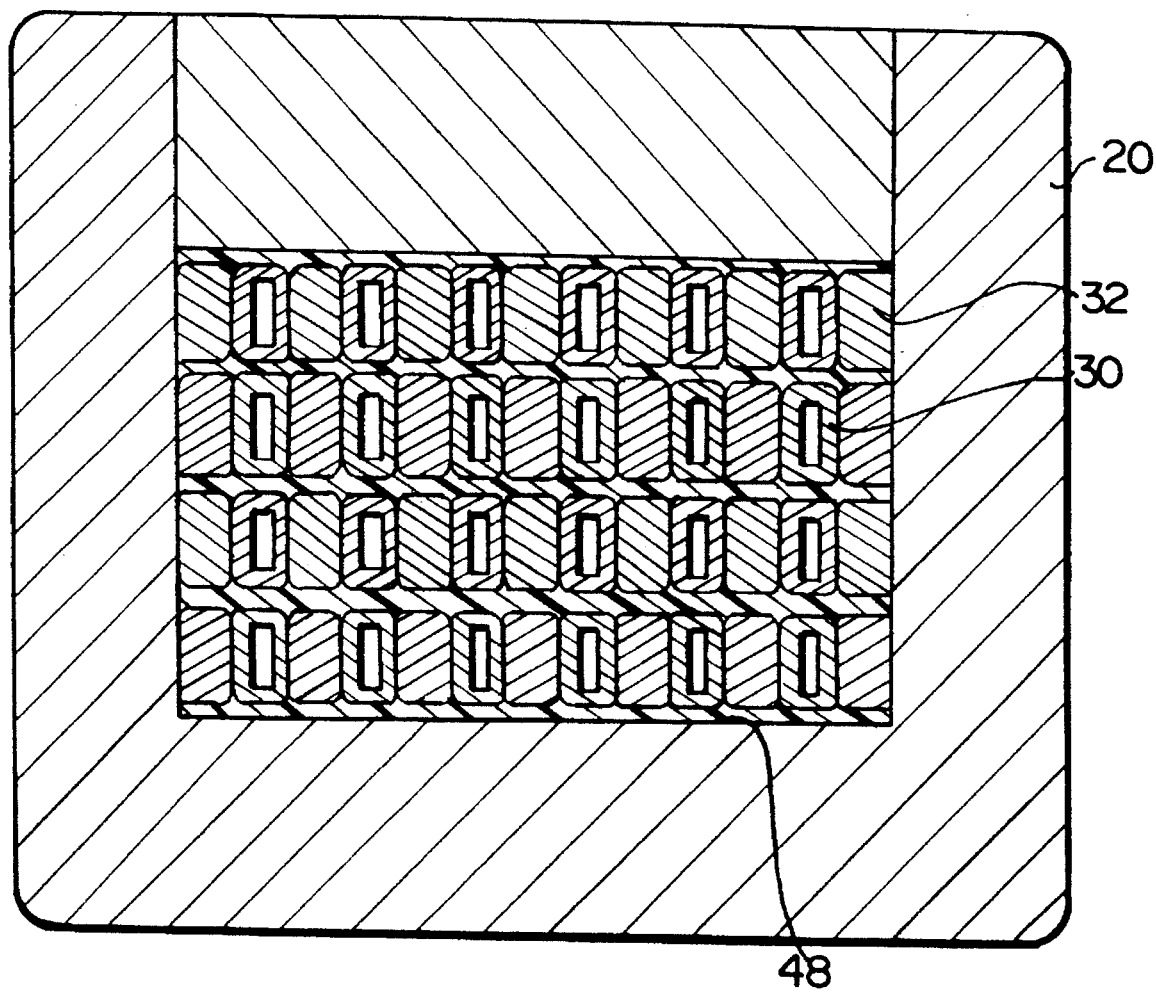
FIG. 2 is a representative end cross-sectional view of the strands of a stator bar within an end fitting.
Figure 3:
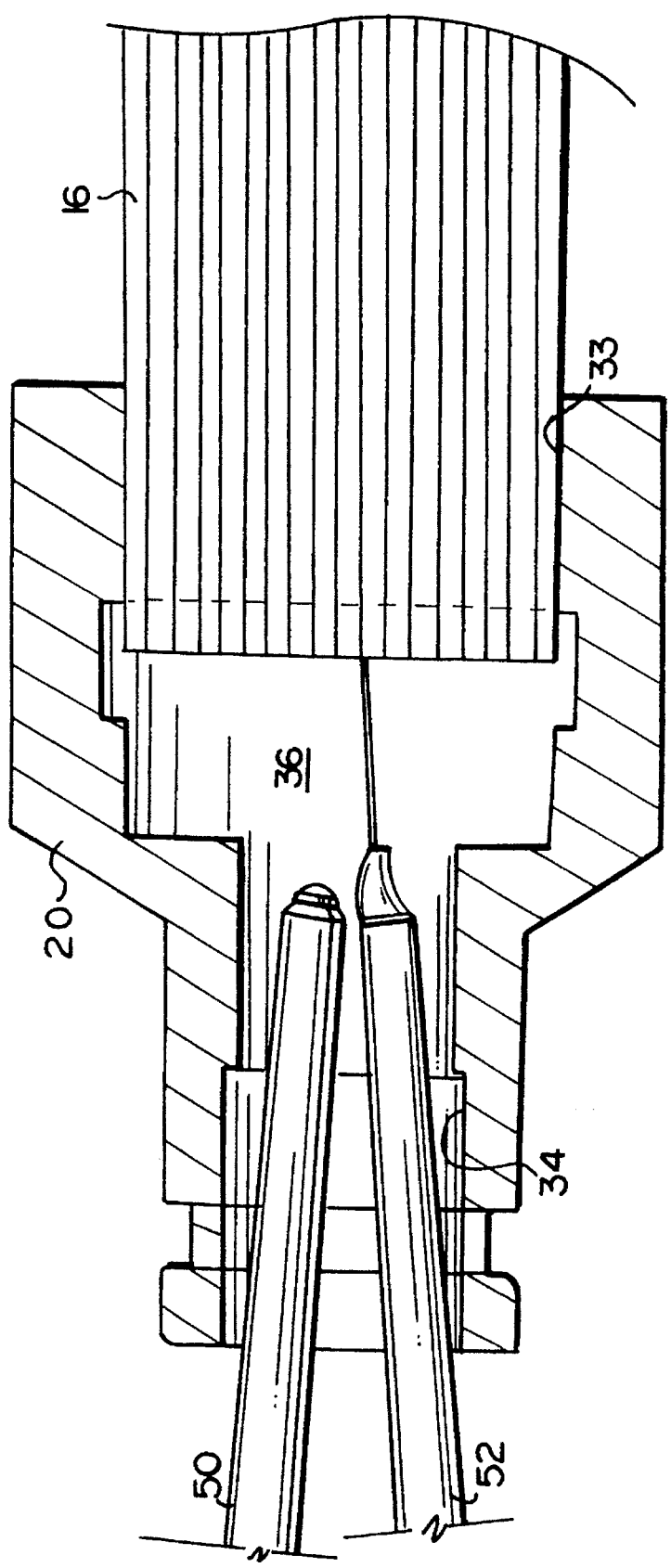
FIG. 3 is an enlarged cross-sectional view illustrating a viewer and applicator in an opening of the fitting applying epoxy to joint portions between adjacent strands in accordance with the present invention.

Referring now to the drawings, particularly to FIG. 1, there is illustrated a liquid-cooled stator winding arrangement used in a typical liquid-cooled generator. A stator core 10 having stator core flanges 12 and core ribs 14 are illustrated, with stator bars 16 passing through radially extending slots and terminating at opposite ends in end fittings 18 and 20. Inlet hoses 22 connect an inlet fitting 18 to an inlet coolant header 24. Outlet hoses 26 connect the outlet fitting 20 to an outlet coolant header 28. As illustrated in FIG. 2, each stator bar includes a plurality of hollow and solid copper strands 30 and 32, respectively, disposed in side-by-side and superposed relation one to the other. The fitting, for example, fitting 20, is similarly formed of an electrically conductive material such as copper. Two types of fittings are disclosed in FIGS. 3 and 4, respectively. In FIG. 3, the fitting comprises a closed body having a rectilinear opening 33 at one end for receiving the strands of the stator bar 16. At the opposite end, there is provided an opening 34 which in use is normally closed by a copper tube which serves as both an electrical connection, as well as a hydraulic conduit for flowing liquid coolant, e.g., deionized water, into or from the chamber 36 defined by the fitting 20 and the exposed ends of the hollow and solid copper strands. The liquid in the chamber 36 either flows into the fitting and through the hollow strands 30 for cooling purposes when the fitting comprises an inlet fitting or receives the liquid coolant from the hollow strands 30 for egress when the fitting is employed as an outlet fitting.

Figure 4:
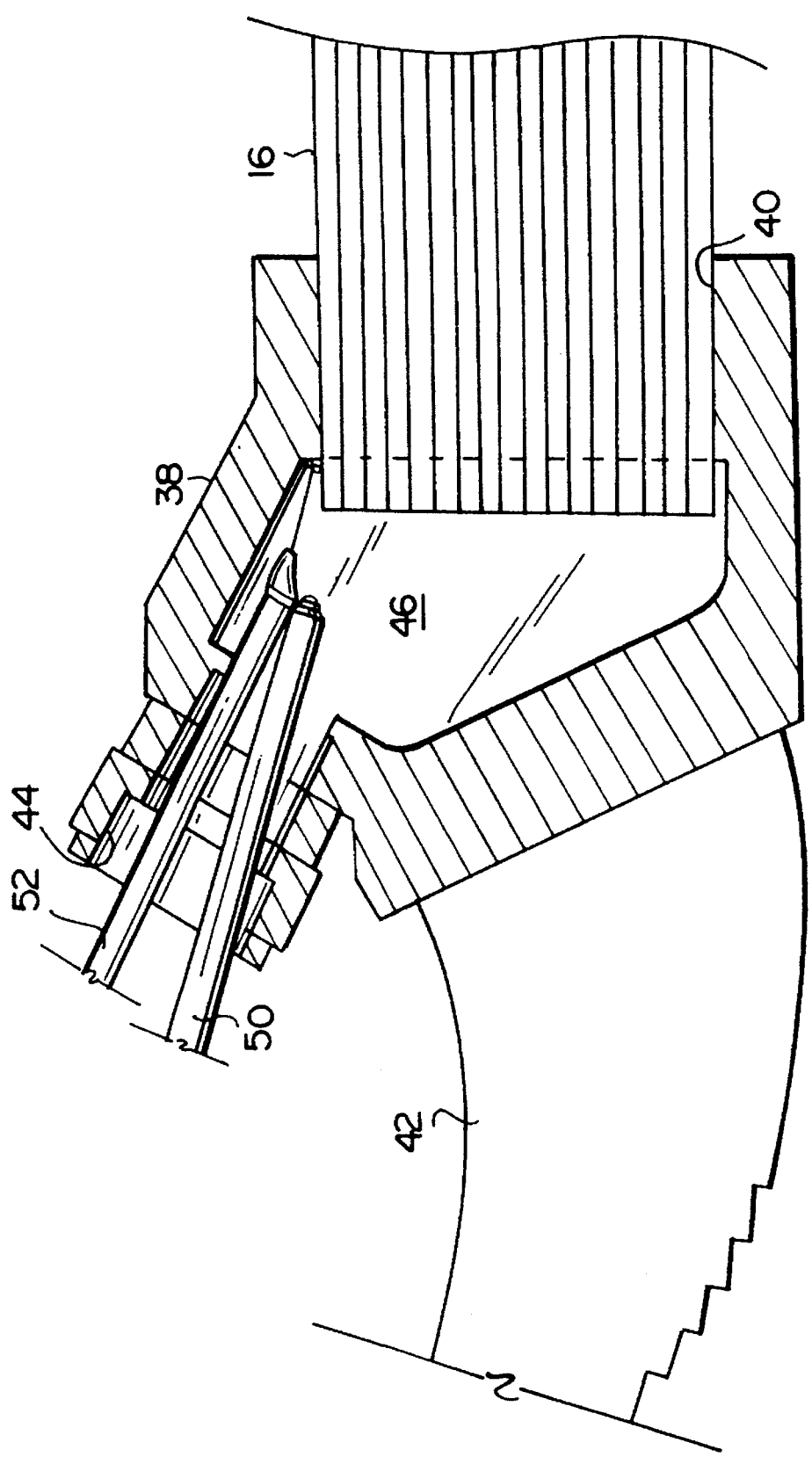
FIG. 4 is a view similar to FIG. 3 illustrating a similar method of application of epoxy in a different type of stator bar end connection with the epoxy being applied to the joint between the fitting and the outermost peripheral strands.

In FIG. 4, the fitting 38 is similar to the fitting of FIG. 3 and includes an opening 40 for receiving the ends of the hollow strands forming the stator bar 16. Leaves 42 extend from the opposite end of this copper fitting 38 for electrical connection with like fittings. Offset from the stator bar 16 is an opening 44 for receiving a hydraulic connection for flowing liquid coolant to or from the fitting 38, depending on whether the fitting is connected to the inlet or the outlet header. Fitting 38, of course, defines a chamber 46 in communication with the strands and particularly the hollow strands 30 of the stator bar 16.

As illustrated in FIG. 2, the strands are brazed to one another, as well as to the inside walls of the fitting. The brazing material 48 preferably comprises a copper phosphorous alloy. As illustrated in the drawing figure, the strands are also brazed to one another within the stator bar. As explained above, it is believed that the initiation of the leakage paths is caused by stagnant coolant liquid in the chamber of the fitting in contact with the brazing material whereby corrosion is initiated. It will also be appreciated from a review of these drawing figures that the leakage path, should one develop, can be circuitous such that the external outlet of the leakage path may be far removed from the inlet of the leakage path in communication with the chamber of the fitting. Thus, a leakage path may develop from within the strands of copper and extend well beyond the fitting manifesting itself along the external periphery of the stator bar. A leakage path may develop at the joint between the fitting and strands and manifest itself externally along a side of the joint opposite from the initiation or inlet portion of the leakage path. Consequently, it is extremely difficult to identify a particular leakage path once a leak is initiated.

In accordance with the present invention, leakage paths are sealed from within the fitting in order that the sealant serve as a seal or insulation barrier between the liquid coolant and the brazing alloy, thus precluding stagnant contact of the liquid coolant with the alloy which is believed to initiate the leaks. To accomplish this, the generator is shut down and the cooling lines drained. At the hydraulic inlet opening, for example, opening 34 in FIG. 3 or 44 in FIG. 4, a viewer is disposed through the opening such that an individual can view the ends of the strands of the stator bar, as well as the joint between the outermost strands of the stator bar and the internal diameter of the opening of the fitting, for example, openings 33 and 40, respectively, of fittings 20 and 38. The viewer may be of any commercially available type and, preferably, a flexible boroscope is used as manufactured by Olympus under Product No. IF 6D4-30. Additionally, a syringe containing an epoxy cement can also be disposed through the inlet openings 34, 44, together with the viewer. The syringe may apply an epoxy resin in two parts for penetration and wet-out followed by a higher viscosity modification of the same liquid epoxy resin. Thus, an initial or first part of the liquid epoxy resin of low viscosity is applied to the leakage paths and which applied resin may readily flow into the various interstices of the joint into which the epoxy is applied. The second part of the resin has a greater viscosity than the first part and is applied in overlying relation to the first part to form a barrier seal between the liquid coolant in the chamber and the joint and particularly the brazed alloy. The liquid epoxy resin may be of the type described in U.S. Pat. No. 5,350,815, of common assignee herewith, the disclosure of which U.S. patent is incorporated herein by reference.

It will be appreciated that other types of resins may be utilized instead. For example, other liquid epoxy resins may include those based on the diglycidyl ether of bisphenol A such as Epon 826 and Epon 828 made by Shell Chemical Co. and other similar resins made by other manufacturers such as Dow Chemical Co. and Ciba Chemical Co.; liquid bisphenol F diglycidyl ether epoxy resins such as Epon DPL-862 (Shell Chemical Co.) or Araldite GY 281 and Araldite GY 308 (Ciba Chemical Co.). Offsets of any of the epoxy resins made by other manufacturers, mixtures of epoxy resins or epoxy resins modified with reactive diluents can also be used. The epoxies also include an additive to make the resins of a particular color, for example, white, for ready visibility against the copper during the repair. A titanium oxide is used as a satisfactory additive.

To employ the present invention, the boroscope 50 is placed through the opening 34, 44 and the first part of the epoxy which is of low viscosity is mixed and provided by way of applicator syringe 52. Applicator syringe 52 is also inserted through the opening 34 and 44. It will be appreciated that the boroscope or viewer and applicator can be combined for use as a single instrument. While viewing the joints between the fitting and the outermost strands of the stator bars, as well as between the strands themselves, the low viscosity epoxy can be applied by the syringe in a manner to overlie the brazing alloy, as well as any other portions of the joints. After the low viscosity epoxy has been applied to all of the joints, the higher viscosity epoxy is then applied to the same joints overlying the low viscosity epoxy. The low viscosity epoxy settles into all of the interstices of the joints, while the higher viscosity epoxy forms a thicker barrier seal between the chamber and any potential leakage paths through the joints between the strands or the joint between the fitting and the outermost strands. After the application of both the low and high viscosity epoxy material, the epoxy is cured by heating.

By the foregoing process, individual leakage paths need not be identified as in prior practice. Preferably, in accordance with this invention, all of the joints which have the potential for forming a leakage path are provided with the two-part sealant. In this way, the existing leak or leaks at the stator bar end connections of a generator in the field are repaired. Additionally, by applying the epoxy to all potential leakage paths of the joints, a seal is provided which will ensure against the formation of leakage paths in the future. That is, the epoxy seal isolates the liquid coolant from the brazing material and seals between the joints of adjacent strands and the outermost strands and the fitting so that all potential leakage paths are epoxy-sealed. While the present invention is particularly applicable to field repairs of existing generators, it may also be applied to generators during initial manufacture to provide further protection against leakage in the stator bar and connections.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of sealing a stator bar end and a fitting receiving the end to effect a seal substantially impermeable to liquid, the fitting having a chamber for receiving a liquid through an opening in the fitting and in communication with hollow strands forming at least a portion of said stator bar end for flow of the liquid through the hollow strands, comprising the steps of:

inserting a viewer and epoxy applicator through the opening in said fitting for viewing a joint portion between the fitting and the stator bar end and applying epoxy thereto, respectively;

viewing said joint portion;

applying the epoxy to said joint portion using said applicator while maintaining the joint portion in view through the viewer; and curing the epoxy to form a seal substantially impermeable to liquid at the portion of the joint to which the epoxy is applied.

2. A method according to claim 1 wherein the step of curing includes heating the epoxy after its application to the joint portion.

3. A method according to claim 1 wherein the epoxy is formed in first and second parts with the first part having a lower viscosity than said second part, the step of applying the epoxy including applying said first epoxy part and subsequently applying said second epoxy part.

4. A method according to claim 1 including applying the epoxy to the entirety of the joint between the fitting and the stator bar end.

5. A method according to claim 1 wherein the joint portion between the stator bar end and the fitting includes a brazing material, and applying the epoxy from within said chamber to overlie the brazing material.

6. A method according to claim 1 including viewing at least portions of joints between adjacent strands of the stator bar end, while viewing the respective joint portions applying the epoxy to said strand joint portions, and curing the epoxy to form a seal at the strand joint portions to which the epoxy has been applied.

7. A method according to claim 6 wherein the joint portions between adjacent strands include a brazing material, and applying the epoxy from within said chamber to overlie the brazing material of the joint portions.

8. A method according to claim 1 including applying the epoxy from within the chamber to each of the joints between the fitting and outermost strands of the stator bar end and between adjacent strands to seal potential leakage paths through the opening in the fitting.

9. A method according to claim 1 including providing a color to the epoxy for enhancing visibility of the epoxy from within the chamber during application of the epoxy.

10. A method of sealing joint portions between strands of a stator bar end and having a fitting receiving the end, the fitting having a chamber for receiving a liquid through an opening and in communication with hollow strands forming at least part of the strands of said stator bar end enabling flow of the liquid through the hollow strands, comprising the steps of:

inserting a viewer through the opening in said fitting for viewing joint portions between adjacent strands;

inserting an epoxy applicator through the fitting opening;

viewing the joint portions between the strands;

applying the epoxy to said joint portions between the strands while maintaining the joint portions between the strands in view through the viewer; and curing the epoxy to form a seal substantially impermeable to liquid at the portion of the joints to which the epoxy is applied.

11. A method according to claim 10 wherein the step of curing includes heating the epoxy after its application to the joint portion.

12. A method according to claim 10 wherein the epoxy is formed in first and second parts with the first part having a lower viscosity than said second part, the step of applying the epoxy including applying said first epoxy part and subsequently applying said second epoxy part.

13. A method according to claim 10 wherein the joint portions between adjacent strands include a brazing material and applying the epoxy from within said chamber to overlie the brazing material of the joint portions.

14. A method according to claim 10 including providing a color to the epoxy for enhancing visibility of the epoxy from within the chamber during application of the epoxy.

15. A method according to claim 10 including applying the epoxy from within the chamber between each of the adjacent strands to seal all of the joints between the strands.

16. A method according to claim 15 wherein the joint portions between each of the adjacent strands include a brazing material, and applying the epoxy from within the chamber to overlie the brazing material of each joint portion.

17. A method according to claim 15 wherein the fitting and outermost strands of said stator bar end form a joint about said strands, applying epoxy to the entirety of the joint between the fitting and the outermost strands, thereby sealing all potential leakage paths between the strands and between the fitting and the outermost strands.

18. A method according to claim 17 wherein the joint portions between each of the adjacent strands and the joints between the outermost strands and the fitting include a brazing material, and applying the epoxy from within the chamber to overlie the brazing material of each joint portion and joints.

19. A method according to claim 18 wherein the epoxy is formed in first and second parts with the first part having a lower viscosity than said second part, the step of applying the epoxy including applying said epoxy part and subsequently applying said second epoxy part.

\* \* \* \* \*